United States Patent
Saxena et al.

(10) Patent No.: US 8,130,210 B2
(45) Date of Patent: Mar. 6, 2012

(54) TOUCH INPUT SYSTEM USING LIGHT GUIDES

(75) Inventors: Kuldeep Kumar Saxena, Singapore (SG); Wee Sin Tan, Singapore (SG); Peng Yam Ng, Singapore (SG); Pak Hong Yee, Singapore (SG); Rani Ramamoorthy Saravanan, Singapore (SG)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 2123 days.

(21) Appl. No.: 11/000,109

(22) Filed: Nov. 30, 2004

(65) Prior Publication Data

US 2006/0114244 A1   Jun. 1, 2006

(51) Int. Cl.
 *G06F 3/042* (2006.01)
(52) U.S. Cl. ............... 345/175; 345/156; 345/173
(58) Field of Classification Search .......... 345/156, 345/173, 175, 176; 178/18.01, 18.03, 18.09, 178/18.11
See application file for complete search history.

(56) References Cited

U.S. PATENT DOCUMENTS

| | | | |
|---|---|---|---|
| 4,521,870 A | | 6/1985 | Babbel et al. |
| 5,001,306 A | * | 3/1991 | Purcell ............ 178/18.09 |
| 5,251,280 A | * | 10/1993 | Asada et al. ............ 385/115 |
| 5,359,155 A | * | 10/1994 | Helser ............ 178/18.11 |
| 5,422,494 A | | 6/1995 | West et al. |
| 5,914,709 A | | 6/1999 | Graham et al. |
| 6,181,842 B1 | | 1/2001 | Francis et al. |
| 6,504,530 B1 | | 1/2003 | Wilson et al. |
| 6,724,968 B2 | * | 4/2004 | Lackritz et al. ............ 385/131 |
| 7,099,553 B1 | * | 8/2006 | Graham et al. ............ 385/146 |
| 7,271,963 B2 | * | 9/2007 | Saxena et al. ............ 359/721 |
| 2006/0237540 A1 | * | 10/2006 | Saxena et al. ............ 235/454 |

FOREIGN PATENT DOCUMENTS

| | | |
|---|---|---|
| EP | 050669 A3 | 12/1992 |
| EP | 0520669 A3 | 12/1992 |
| GB | 21880061 A | 3/1987 |
| JP | 02081222 A | 9/1988 |
| JP | 09022329 A | 7/1995 |

OTHER PUBLICATIONS

Uk Search Report.

* cited by examiner

*Primary Examiner* — My-Chau T Tran

(57) ABSTRACT

A touch input system includes a light-emitting device, a bent light guide and a light detector. The light-emitting device emits light. The bent light guide receives the light emitted by the light-emitting device and guides the light to travel in a direction across a face of a display screen. The light detector detects the light.

20 Claims, 6 Drawing Sheets

TOUCH INPUT SYSTEM USING LIGHT GUIDES

BACKGROUND

Touch panel displays can be implemented using a variety of underlying technologies to provide touch input. The underlying technologies include, for example, resistive touch input systems, capacitive touch input systems, acoustic wave touch input systems, and infrared touch input systems. There are also other technologies used to implement touch input systems, such as near field imaging and corner camera imaging.

For miniature devices such as personal digital assistants (PDAs) and hand phones, the most common technologies used for touch input systems are resistive touch input systems and capacitive touch input systems.

Infrared touch input systems have been used in many applications such as, for example, automated teller machines (ATMs), food service and preparation computers, KIOSKs, medical instrumentation, process control systems, and transportation tracking applications. One advantage of infrared touch input systems is that these systems do not require that any material that could inhibit screen clarity or brightness be placed over a display screen.

Infrared touch input systems typically use light-emitting diodes (LEDs) along with opposing photodiodes or phototransistor detectors that operate above a display surface. A special bezel is used over the LEDs and photodiodes or phototransistors above the display surface. Controller circuitry controls scanning above the display surface with an invisible lattice of infrared light beams. The scanning is implemented by LEDs generating pulsed light beams that are detected by opposing photodetectors. Failure to detect light beams of a pulsed LED indicates an object, such as a stylus or finger, has interrupted the light beam transmission.

The space required to house LEDs and photodetectors can undesirably increase the size necessary to implement an infrared touch input system for miniature devices such as hand phones and PDAs. The LEDs and photodetectors are typically mounted on rectangular frame and extend the length and width of the device. It is important, therefore, to minimize the form factor for infrared optical touch input devices used for miniature devices such as hand phones and PDAs.

SUMMARY OF THE INVENTION

In accordance with an embodiment of the present invention, a touch input system includes a light-emitting device, a bent light guide and a light detector. The light-emitting device emits light. The bent light guide receives the light emitted by the light-emitting device and guides the light to travel in a direction across a face of a display screen. The light detector detects the light.

DESCRIPTION OF THE EMBODIMENT

Figure 1:
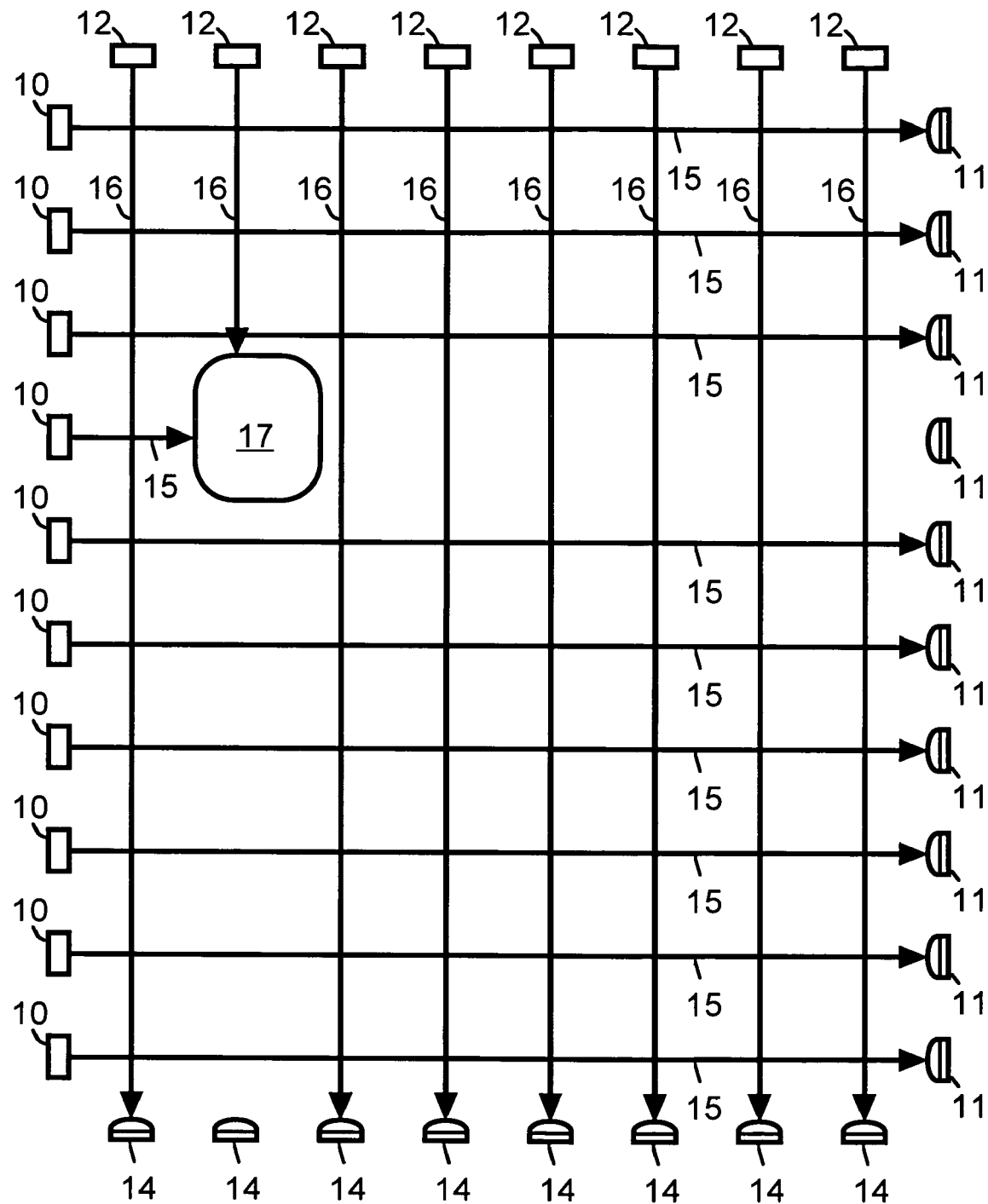
FIG. 1 is a simplified diagram illustrating operation of an infrared touch input system.

FIG. 1 is a simplified diagram illustrating operation of an infrared touch input system. In the horizontal direction, light emitters 10 generate light beams, represented by arrows 15, that are detected by light detectors 11. In the vertical direction, light emitters 12 generate light beams, represented by arrows 16, that are detected by light detectors 13.

For example, light emitters 10 are implemented by light-emitting devices and light guides bent at an angle of approximately 90 degrees, as more fully described below. Light emitters 12 are implemented by light-emitting devices and light guides bent at an angle of approximately 90 degrees, as more fully described below. Light detectors 11 are implemented by light guides bent at an angle of approximately 90 degrees and photodiodes or phototransistors, as more fully described below. Light detectors 13 are implemented by light guides bent at an angle of approximately 90 degrees and photodiodes or phototransistors, as more fully described below.

While light guides may be bent at an angle of approximately 90 decrees, a different amount of bending may be utilized. For example, light guides bent in a half circle allow light emitters and/or light detectors to be located under a display. Similarly, for some applications, it may only be necessary for light guides to be bent 45 degrees, etc.

Light emitters 10 and light emitters 12 emit light one by one. When an object interrupts transmission of light, the interruption is detected by an activated light detector opposite the light emitter transmitting light. This is illustrated by an object 17 interrupting light transmitted from one of light emitters 10 to light detectors 11 and interrupting light transmitted from one of light emitters 12 to light detectors 14. Object 17 is, for example, a finger, a stylus, or another type of instrument used for pointing. By determining to which light detectors light transmission is interrupted, x and y coordinates to object 17 is obtained. This coordinate data is used by a host computing device.

The use of bent light guides, as shown in FIG. 1, minimizes the width and height of the frame used to support the touch input system within the miniaturized device. The frame used to support the touch input system within the miniaturized device supports the light detectors, the light emitters, any printed circuit board on which the light emitters and light detectors, and any bent light guides used.

Figure 2:
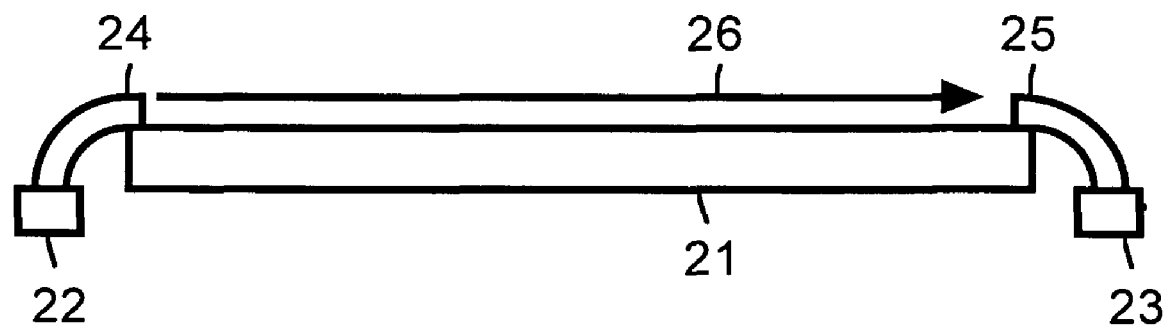
FIG. 2 is a simplified diagram illustrating use of light guides within an infrared touch input system in accordance with an embodiment of the present invention.

FIG. 2 illustrates placement of light emitters and light guides relative to a display system 21. A light-emitting device 22 generates light that is transmitted through a light guide 24. For example, light-emitting device 22 is a light-emitting diode or some other type of light-emitting device. Light guide 24 is bent at an angle of approximately 90 degrees. An arrow 26 represents direction of light emitted from light guide 24 and across the face of display system 21. When not intercepted, the light emitted from light guide 24 is received by a light guide 25. Light guide 25 is bent at an angle of approximately 90 degrees. Light received by light guide 25 is directed to a photo detector 23. For example photo detector 23 is a photodiode, phototransistor, or some other device that detects light.

For example, light-emitting device 22 has an extended surface of emission and generates light that is incoherent. Light guide 24 is attached to light-emitting device 22 using optical cement having matching refractive index with light guide 24. Light guide 25 is attached to photo detector 23 using optical cement/epoxy having matching refractive index with light guide 25.

When designing an architecture for a touch input device, such as one having light-emitting device 22, light guide 24, light guide 25 and light photo detector 23, for a specific application, an optics simulation program can be used. Additionally, a ray tracing can be used to know the optical behavior of the light guides 24 and 25. As a simple sequential ray tracing approach has some limitations, non-sequential rays can be traced to simulate the light output. The simulation of light guides consists, for example, of calculating the propagation of light through the right angle pipe. The pipe can be, for example, a cylindrical or rectangular, glass or polymer pipe.

While FIG. 2 shows two light guides being used to guide light from light emitter 22 to photo detector 23, one light guide for each, in alternative embodiments of the present invention, only one light guide may be used. That is, the light emitter is implemented using a light-emitting device and a light guide and the light detector is implemented using a photo detector without a light guide. Alternatively, the light emitter is implemented using a light-emitting device without a light guide and the light detector is implemented using a photo detector and a light guide.

While FIG. 2 shows light guides bent at an angle of approximately 90 decrees, a different amount of bending may be utilized. For example, light guides bent in at a 45 degree angle. Alternatively, for example, light guides bent in a half circle allow light emitters and/or light detectors to be located under a display. This is illustrated by FIG. 3.

Figure 3:
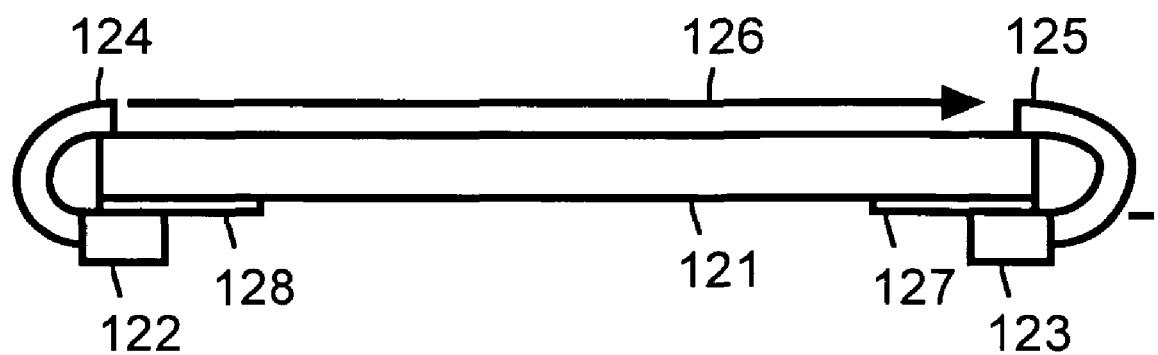
FIG. 3 is a simplified diagram illustrating use of light guides within an infrared touch input system in accordance with another embodiment of the present invention.

FIG. 3 shows placement of light emitters and light guides relative to a display system 121. A light-emitting device 122, mounted on a base piece 128, generates light that is transmitted through a light guide 124. For example, light-emitting device 122 is a light-emitting diode or some other type of light-emitting device. Light guide 124 is bent at an angle of approximately 180 degrees. An arrow 126 represents direction of light emitted from light guide 124 and across the face of display system 121. When not intercepted, the light emitted from light guide 124 is received by a light guide 125. Light guide 125 is bent at an angle of approximately 180 degrees. Light received by light guide 125 is directed to a photo detector 123, mounted on a base piece 127. For example photo detector 123 is a photodiode, phototransistor, or some other device that detects light.

For example, light-emitting device 122 has an extended surface of emission and generates light that is incoherent. Light guide 124 is attached to light-emitting device 122 using optical cement/epoxy having matching refractive index with light guide 124. Light guide 125 is attached to photo detector 123 using optical cement having matching refractive index with light guide 125.

Figure 4:
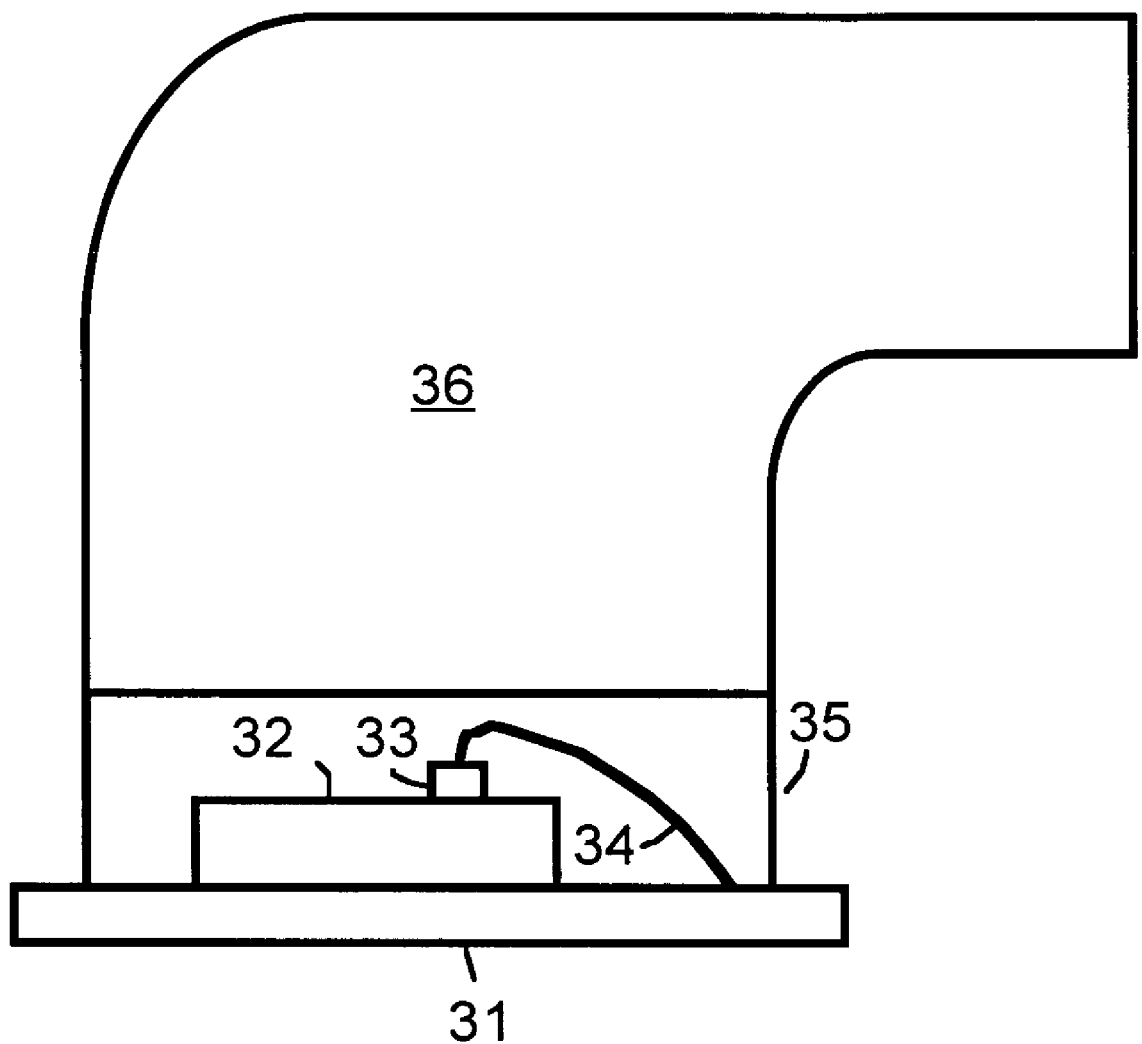
FIG. 4 is a simplified diagram illustrating implementation of a light-emitting diode within an infrared touch input system in accordance with an embodiment of the present invention.

FIG. 4 is a simplified diagram illustrating implementation of light-emitting device 22 and photo detector 23. A printed circuit board (PCB) 31 is, for example, a flex, thinner PCB used to reduce the width and height of packaging. For example PCB 31 uses Bismaleimide Triazine (BT) and FR4 substrate to achieve a thickness as thin as 0.3 to 0.4 millimeters in thickness. Alternatively, Flexible Circuit (FC) can be used to implement PCB 31. FC is polyamide-based material that can be as thin as 0.2 to 0.3 mm for 2-layer circuits. FC also has the advantage of flexibility over conventional rigid PCB materials. FC is widely used in camera, cellular phone, printer applications where space is limited. FC can also be folded to snap-in spaces such as between a main board a chassis. FC is preferred, for example, when the touch input system is to be applied together with a non-active liquid crystal display (LCD) with a typical cross-sectional space of only 2×2 mm. Polyamide has a higher breakdown voltage than FR4 per mil of thickness and performs better when subjected to extreme temperature and environmental conditions.

A die 32 is mounted on PCB 31. For example, die 32 is an LED die when a light-emitting device is being implemented. Alternatively, die 32 is a photo diode die when a photo detector is being implemented. A gold wire 34 is connected to a contact 33 on die 32 and is connected to PCB 31. For example, when PCB 31 is implemented using FC, gold wire 34 is bonded directly on PCB 31. A light guide 36 is shown attached to die 32 using index matching optical cement/epoxy 35. The composition of index matching optical cement 35 is selected to have good transmission in the infrared region.

Figure 5:
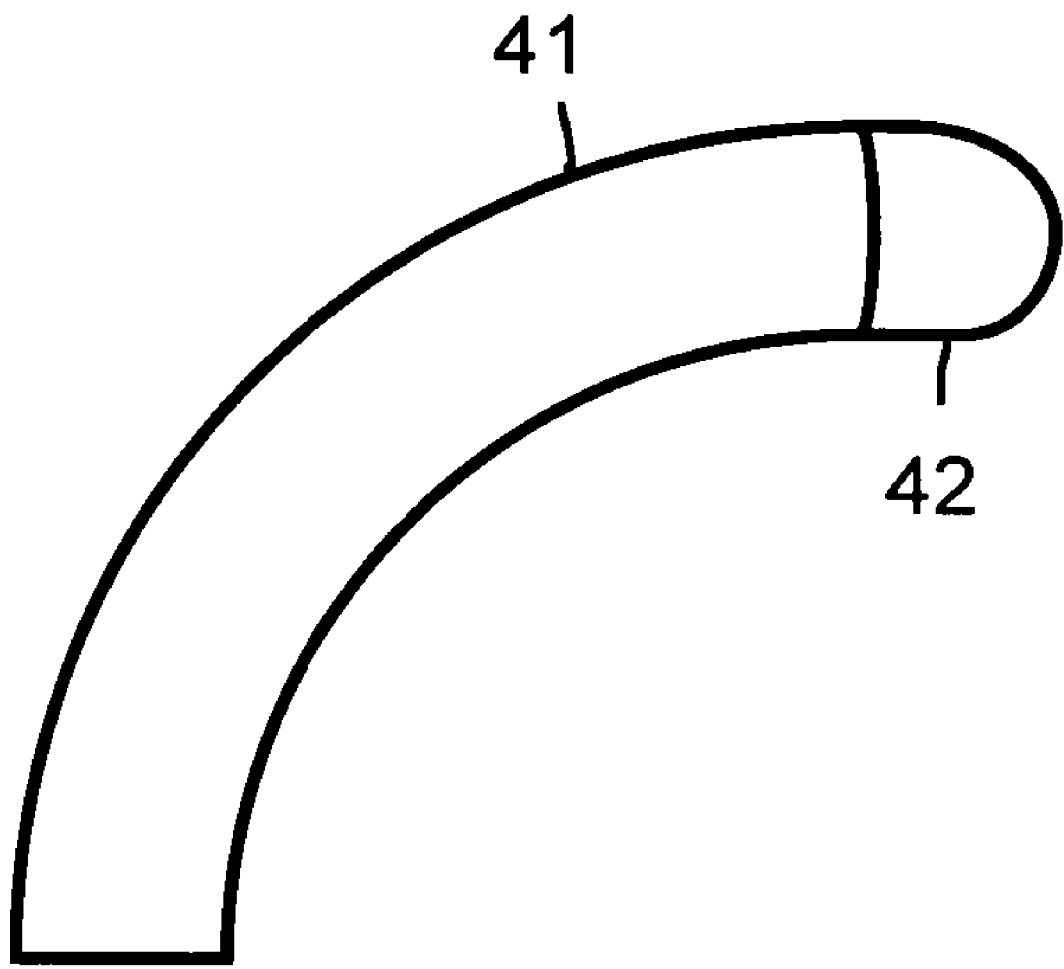
FIG. 5 shows use of a lens at the tip of a light guide in accordance with an embodiment of the present invention.

The use of light guides, as discussed herein, allows smaller packaging for infrared touch input systems or other systems that use light detection to determine locations of touch input. For applications like mobile phones that require minimum height attenuation in irradiance when light exits the light guide, a lens tip can be used at the tip of the light guide. This is illustrated in FIG. 5. In FIG. 5 a lens tip 42 is attached or generated at the end of a light guide 41.

Figure 6:
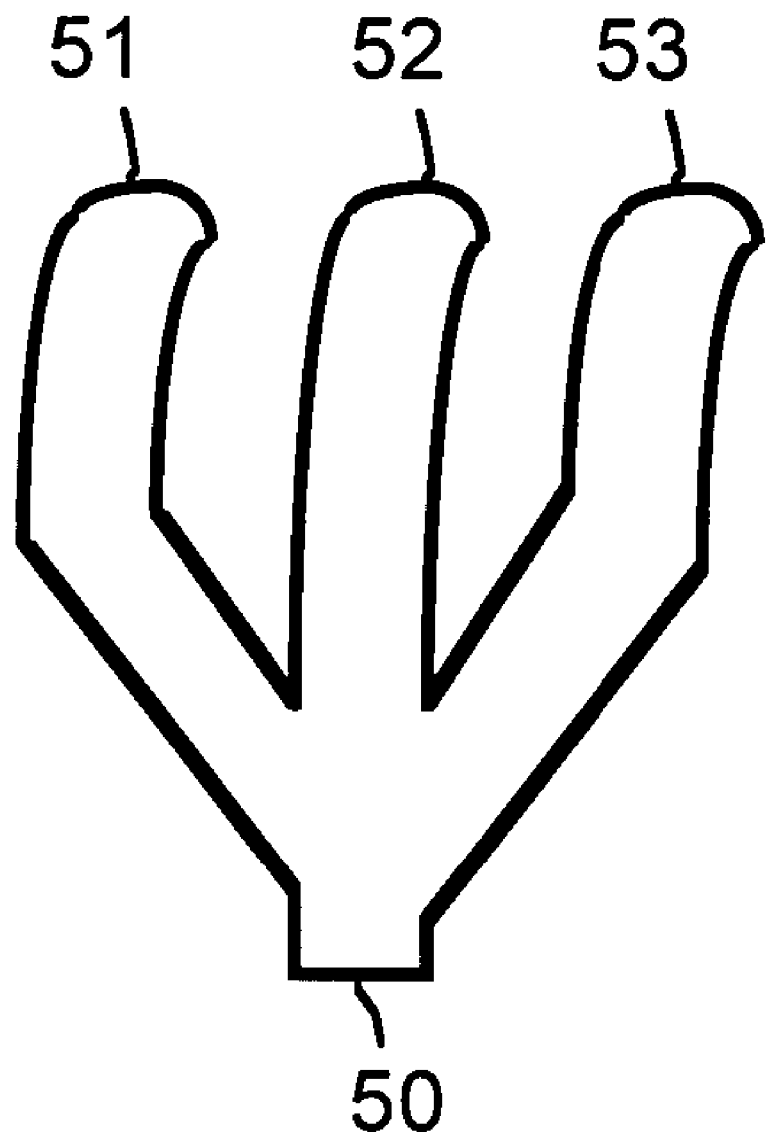
FIG. 6 is a simplified diagram illustrating branching out of light guides used within an infrared touch input system in accordance with an embodiment of the present invention.

In alternative embodiments of the present invention branching out the light guides can be used to limit the number of LEDs and/or Photodiodes units that are required to implement an infrared touch input system. This is illustrated in FIG. 6. FIG. 6 shows a light guide 50 with three branches.

There is no limitation on the branches that can be used, except however, that the resulting touch input system needs to be able to detect and report a two dimensional coordinate indicating a location where an object interrupts light being transmitted from one of light emitters to light detectors. For example, branching of light guides can be used so that one light emitter is used with a larger number of photo detectors. Alternatively, branching of light guides could be used so that one light detector is used with a larger number of light emitters.

In alternative embodiments of the present invention, a single source can be used with uniform radiation at exit ports of light guides. Similarly, a single photodiode such as a position sensitive detector can be used to reduce the number of photo detectors necessary.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A touch input system comprising:
a light-emitting device that emits light;
a bent light guide that receives the light emitted by the light-emitting device and guides the light to travel in a direction across a face of a display screen on a first plane, the bent light guide being bent on a second plane that is orthogonal to the first plane; and,
a light detector that detects the light.

2. A touch input system as in claim 1 wherein the bent light guide is bent approximately 90 degrees on the second plane.

3. A touch input system as in claim 1 wherein the bent light guide is a first bent light guide, and wherein the light detector comprises:

a second bent light guide that receives the light after the light travels across the face of the display screen; and, a photo detector that receives the light from the second bent light guide.

4. A touch input system as in claim 3 wherein the first bent light guide is bent approximately 180 degrees on the second plane and wherein the second bent light guide is bent approximately 180 degrees on the second plane.

5. A touch input system as in claim 3 wherein the second bent light guide includes a plurality of branches that allow the second bent light guide to direct light from multiple light-emitting devices to the photo detector.

6. A touch input system as in claim 1 wherein the bent light guide is one of the following:
   a cylindrical glass pipe;
   a rectangular glass pipe;
   a cylindrical polymer pipe; and
   a rectangular polymer pipe.

7. A touch input system as in claim 1 wherein the bent light guide includes a plurality of branches that allow the bent light guide to provide light to multiple light detectors.

8. A touch input system comprising:
   a display screen;
   at least one light emitter situated along a first edge of the display screen and along a second edge of the display screen;
   at least one photo detector; and,
   at least one bent light guide located along a third edge of the display screen and along a fourth edge of the display screen, wherein the third edge of the display is opposite the first edge of the display, and wherein the fourth edge of the display is opposite the second edge of the display;
   wherein the at least one bent light guide guides light originating from the at least one light emitter across the display screen on a first plane to the at least one photo detector, the bent light guide being bent on a second plane that is orthogonal to the first plane.

9. A touch input system as in claim 8 wherein each of the at least one bent light guide is bent approximately 180 degrees on a plane orthogonal to the first plane.

10. A touch input system as in claim 8 wherein the at least one photo detector is a plurality of photo detectors and the at least one bent light guide is a plurality of bent light guides wherein each bent light guide from the plurality of bent light guides light to an associated photo detector from the plurality of photo detectors.

11. A touch input system as in claim 8 wherein the at least one bent light guide comprises at least one bent light guide with a plurality of branches, each bent light guide with a plurality of branches guiding light from multiple light emitters to a single photo detector from the at least one photo detector.

12. A touch input system as in claim 8 wherein the at least one light emitter comprises at least one light-emitting device and a second at least one bent light guide, wherein the second at least one bent light guide directs light from the at least one light-emitting device across the display screen.

13. A touch input system as in claim 12 wherein the at least one light-emitting device is a plurality of light-emitting devices and the second at least one bent light guide is a plurality of bent light guides wherein each bent light guide from the plurality of bent light guides receives light from an associated light-emitting device from the plurality of light-emitting devices.

14. A touch input system as in claim 12 wherein the second at least one bent light guide comprises at least one bent light guide with a plurality of branches, each bent light guide with a plurality of branches receiving light from an associated light-emitting device from the plurality of light-emitting devices.

15. A method for providing touch input to a device, the method comprising:
   emitting light from a light-emitting device;
   using a bent light guide to change direction of light emitted from the light-emitting device so that the light travels in a direction across a face of a display screen on a first plane, the bent light guide being bent on a second plane that is orthogonal to the first plane; and,
   detecting the light with a light detector.

16. A method as in claim 15 wherein the bent light guide changes the direction of the light approximately 90 degrees on the second plane.

17. A method as in claim 15 wherein detecting the light with a light detector includes the following step:
   using a second bent light guide to change direction of the light so that the light is received by a photo detector.

18. A method as in claim 17 wherein the bent light guide changes the direction of the light approximately 90 degrees on the second plane and wherein the second bent light guide changes the direction of the light approximately 90 degrees on the second plane.

19. A method as in claim 17 wherein the second bent light guide includes a plurality of branches that allow the second bent light guide to direct light from multiple light-emitting devices to the photo detector.

20. A method as in claim 15 wherein the bent light guide includes a plurality of branches that allows the bent light guide to provide light to multiple light detectors.

* * * * *